United States Patent
Van Andel

(10) Patent No.: US 6,679,991 B1
(45) Date of Patent: Jan. 20, 2004

(54) PERVAPORATION DEVICE AND IRRIGATION MAT

(75) Inventor: Eleonoor Van Andel, Enschede (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/831,789

(22) PCT Filed: Oct. 25, 1999

(86) PCT No.: PCT/EP99/08159

§ 371 (c)(1),
(2), (4) Date: Jul. 2, 2001

(87) PCT Pub. No.: WO00/28807

PCT Pub. Date: May 25, 2000

(30) Foreign Application Priority Data

Nov. 13, 1998 (EP) .............................................. 98203808

(51) Int. Cl.$^7$ ............................................... B01D 63/00
(52) U.S. Cl. ............................... 210/321.6; 210/321.75; 210/640; 96/6; 47/48.5; 47/51; 47/58; 47/66.7
(58) Field of Search ............................ 210/640, 321.6, 210/321.75; 96/6; 95/52; 202/234; 47/66.7, 48.5, 51, 58, 79; 405/52

(56) References Cited

U.S. PATENT DOCUMENTS

| | | | |
|---|---|---|---|
| 4,698,135 A | 10/1987 | Raab | ........................... 202/234 |
| 5,562,826 A | 10/1996 | Schneider et al. | ........... 210/490 |
| 5,595,662 A | 1/1997 | Sanderson | .................... 210/640 |
| 5,744,570 A | 4/1998 | Gebben | ....................... 528/170 |
| 5,989,697 A | 11/1999 | Gebben | ..................... 428/315.5 |
| 6,187,696 B1 * | 2/2001 | Lim et al. | |
| 6,534,561 B1 * | 3/2003 | Corzani et al. | |

FOREIGN PATENT DOCUMENTS

| | | | |
|---|---|---|---|
| EP | 465306 | 1/1992 | ........... B01D/71/56 |
| EP | 543171 | 5/1993 | ........... B01D/71/56 |
| EP | 761715 | 3/1997 | ........... C08G/69/40 |
| WO | 94/28706 | 12/1994 | ........... A01G/25/02 |
| WO | 95/24260 | 9/1995 | ........... B01D/61/36 |

OTHER PUBLICATIONS

E. Korngold et al., "Water Desalination by Pervaporation with Hollow Fiber Membranes", Desalination 107 (1996), 121–129.

Search Report of PCT/EP99/08159.

* cited by examiner

Primary Examiner—Ana Fortuna
(74) Attorney, Agent, or Firm—Richard P. Fennelly

(57) ABSTRACT

Pervaporation device for the desalination of salt water comprising a channel or cavity for holding or transporting salt water and a liquid-water-impermeable, water-vapour-permeable non-porous membrane, which is made of a copolyether amide wherein the polyether and (poly)amide segments are linked via amide bridges.

11 Claims, 1 Drawing Sheet

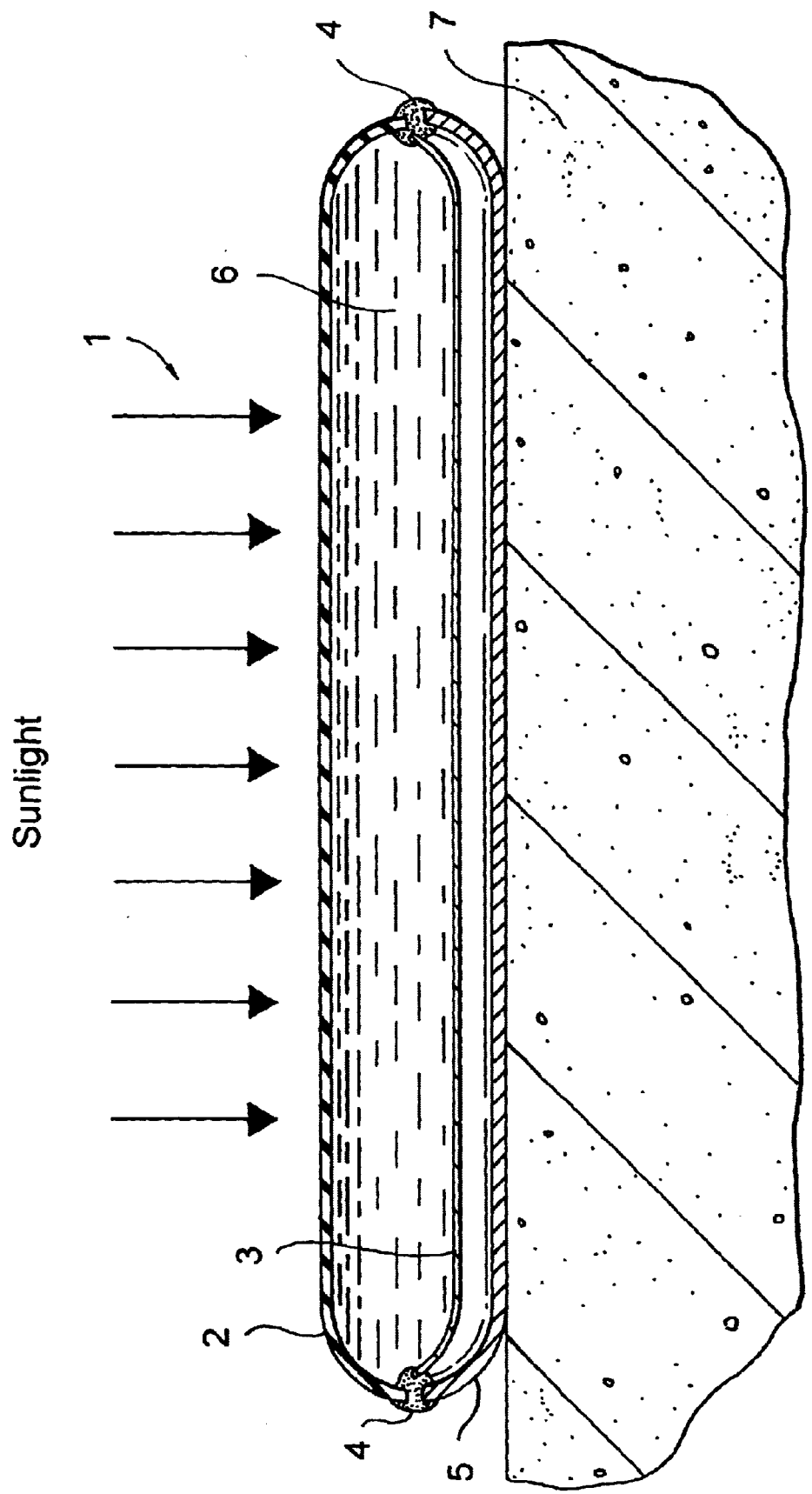

PERVAPORATION DEVICE AND IRRIGATION MAT

The present invention concerns a pervaporation device for the desalination of salt water comprising a channel or cavity for holding or transporting salt water and a liquid-water-impermeable, water-vapour-permeable membrane.

Pervaporation devices for the preparation of fresh water from salt water (i.e. desalination) are known in the art. International patent application WO 94/28706 discloses an irrigation mat comprising at least four layers (see especially FIGS. 1 and 2, in conjunction with page 5, line 7 to page 7, line 13): a top sheet made of a water-impermeable material, such as PE, PP, or PVC, a second sheet of a hydrophobic porous material, such as polytetrafluoroethylene, which does not allow the permeation of liquid water but does allow the permeation of water vapour and which forms with said top sheet a channel for containing salt water, and a third and a fourth sheet forming a channel for a cooling liquid which serves to condense the water vapour that has permeated through the second layer.

U.S. patent publication U.S. Pat. No. 4,698,135 discloses a desalinating drip irrigator "powered" by solar energy (see especially FIGS. 1 and 2 in conjunction with column 5, lines 11 to 65). The irrigator comprises an elongated evaporator plate (numeral 12 in FIG. 2) made of a hydrophobic porous material, which plate is supported above the soil by means of a pair of depending skirts (20). On top of the plate a plurality of elongated, parallel ducts (26) is provided for guiding salt water. The ducts are made of a solar radiation absorbent material, which is black for maximum retention of solar energy. Upon exposure to solar radiation, the salt water is heated, water evaporates and diffuses through the plate, and condenses on the soil below.

Unfortunately, during prolonged use of the said devices, it appeared that the hydrophobic porous films suffer from scaling and biofouling, which prohibits extended use or else necessitates costly maintenance.

International patent application WO 95/24260 concerns a device for, inter alia, purifying substances, e.g. waste water, by means of a membrane for separation by pervaporation. The liquid-water-impermeable, water-vapour-permeable membrane is non-porous and consists of a polymer based on hydrophilic copolyetherester (see the abstract on the front page and page 7, lines 13 to 27).

Finally, U.S. Pat. No. 5,595,662 discloses a desalination device comprising a cavity for transporting salt water. The device is made up of non-porous polymer materials, such as hydrophilic polyurethane or PEBAX. PEBAX is a polyether block polyamide in which the polyether and the polyamide segments are linked via ester bridges.

Although scaling and biofouling probably do not occur in the membranes according to WO 95/24260 and U.S. Pat. No. 5,595,662, these membranes were found to deteriorate fairly rapidly when exposed to heat and sea water and hence are unsuitable for use in desalination pervaporators.

It is an object of the present invention to provide a desalination pervaporator which does not exhibit the disadvantages of the prior art. This object is achieved by using a non-porous membrane which is made of a copolyether amide which comprises (a) units of the following structure (I)

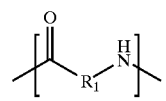

and/or (II)

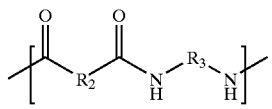

wherein $R_1$ has the meaning of an alkylene group with 3 to 11 carbon atoms which may be substituted or not, and $R_2$ and $R_3$ may be the same or different and represent a (cyclo)alkylene group with 4 to 11 carbon atoms which may be substituted or not or a difunctional aromatic group, (b) polyoxyalkylene containing units of the following formula (III)

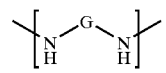

wherein G stands for a polyoxyalkylene group and (c) units of the following formula (IV)

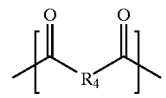

wherein $R_4$ has the meaning of a (cyclo)alkylene group which may be substituted or not, a polyoxyalkylene group or a difunctional aromatic group, and wherein units (III) are linked to units (I) and/or (II) and/or (IV) via amide bridges.

It was found that the polymers according to the invention are exceptionally long-term resistant to the aggressive combination of heat and sea water, which makes them eminently suitable for use in solar heated pervaporation devices.

It is noted that DE 42 37 604 A1 describes the use of a membrane made of a polymer comprising polyether segments for ultrafiltration. Polyamide-polyether-block copolymers, such as PEBAX are mentioned as preferred polymers. Desalination, irrigation, and the problems relating to these fields of use are in no way suggested or disclosed. Furthermore, as stated above, membranes made of this polymer were found to deteriorate fairly rapidly when exposed to heat and sea water.

It is further noted that films made of the polymer used in the present invention are described in EP 0761715 A1. However, this reference is directed to a completely different field, viz. the use of this polymer in rainwear, tents, seat covers, underslating for roofing, waterproof shoes, mattress covers, medical purpose garments, and dressings. The problem of long-term stability of the polymer material in relation to sea water is not addressed in this reference and the use of a membrane made of this polymer in a pervaporation device is neither disclosed nor suggested therein.

In the following, the present invention will be described in detail.

As described above, the present invention relates to a pervaporation device for the desalination of salt water comprising a channel or cavity for holding or transporting salt water and a liquid-water-impermeable, water-vapour-permeable non-porous membrane wherein the membrane is made of a copolyether amide which comprises (a) units of the following structure (I)

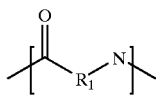

and/or (II)

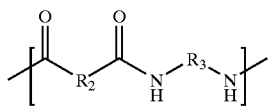

wherein $R_1$ has the meaning of an alkylene group with 3 to 11 carbon atoms which may be substituted or not, and $R_2$ and $R_3$ may be the same or different and represent a (cyclo)alkylene group with 4 to 11 carbon atoms which may be substituted or not or a difunctional aromatic group, (b) polyoxyalkylene containing units of the following formula (III)

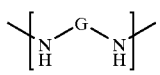

wherein G stands for a polyoxyalkylene group and (c) units of the following formula (IV)

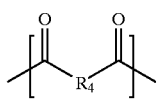

wherein $R_4$ has the meaning of a (cyclo)alkylene group which may be substituted or not, a polyoxyalkylene group or a difunctional aromatic group, and wherein units (III) are linked to units (I) and/or (II) and/or (IV) via amide bridges.

As is known to the skilled person, an amide bridge is a structural unit of the formula

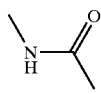

Hence, e.g., unit (III) being linked to unit (I) via an amide bridge means that they form the following structure (the amide bridge is indicated in bold type):

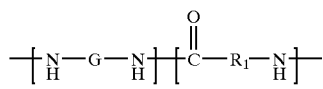

Preferably, the copolyether amide comprises 30–80 wt %, more preferably 40–70 wt %, and most preferably 55–65 wt % of units (I) and/or (II), and 20–70 wt %, more preferably 30–60 wt %, and most preferably 35–45 wt % of units (III), based on the total weight of units (I), (II) and (III) contained in the copolyether amide. It is further preferred that the polymer comprises units (III) and (IV) in a molar ratio of 0.8–1.2, more preferably 0.9–1.1, still more is preferably 0.95–1.05 and most preferably 1.0.

Unit (I) is generally formed by ring-opening of lactams. Suitable lactams are, e.g., gamma-butyrolactam, delta-valerolactam, epsilon-caprolactam, omega-lauryllactam or caprilactam, with epsilon-caprolactam being preferred. Generally, in the copolyether amide of the present invention, units (I) are linked to further units (I), thus forming blocks of their own, such as a polycaprolactam.

Unit (II) is generally formed by the reaction of a dicarboxylic acid and a diamine. Suitable diamines are tetramethylene diamine, hexamethylene diamine, diaminocyclohexane, 4,4'-diaminodicyclohexylene diamine, isophorone diamine, and 1,4-bisdiaminomethyl cyclohexane. Examples of suitable dicarboxylic acids are adipic acid, sebacic acid, terephthalic acid, isophthalic acid, 2,6-naphthalene dicarboxylic acid, and cyclohexane dicarboxylic acid. Generally, in the copolyether amide of the present invention, units (II) are linked to further units (II), thus forming blocks of their own. Preferred blocks are polyamide-6,6 and/or polyamide-6,12.

It is also possible to use combinations of units (I) and (II). Especially important are combinations of caprolactam and polyamide-6,6, with preference being given to compositions made up of caprolactam incorporating up to a maximum lo of 30 wt % of polyamide-6,6, or to compositions made up of polyamide-6,6 incorporating up to a maximum of about 40 wt % of caprolactam.

In unit (III), G has the meaning of a polyoxyalkylene group (also denoted as polyalkylenoxide). Generally, it has a molecular weight of 600–6000 and preferably of 1000–4000. Preferably the atomic ratio of carbon to oxygen in G ranges from 2.0 to 4.3.

Unit (III) can have, e.g., the following structure(s):

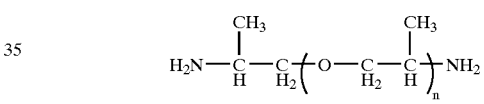

wherein n is 25 to 40, preferably 30–40 and most preferably =±33 (medium value) and/or

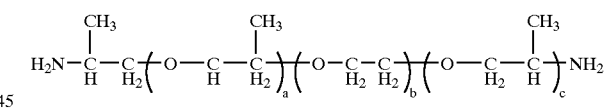

wherein c stands for at least 1, (a+c) is at least 1, but less than 6, preferably ±5.5 (medium value) and b represents at least 10, but not more than 90, preferably 35–45 and most preferably ±37.5 (medium value).

One particular example of G is a polyethylene oxide. In this case, the copolyether amide preferably comprises 10–30 wt %, more preferably 15–25 wt % of ethylene oxide groups, based on total weight of units (I), (II), and (III) contained in the copolyether amide.

As stated above, $R_4$ in unit (IV) has the meaning of a (cyclo)alkylene group which may be substituted or not, a polyoxyalkylene group or a difunctional aromatic group. Starting materials to be used for the formation of units (IV) are generally dicarboxylic acids. Such a dicarboxylic acid may be, e.g., an unsaturated dicarboxylic acid or a dicarboxylic acid having a functional group such as malic acid. The application of such a dicarboxylic acid makes it possible to incorporate functional groups into the polymer.

Also preferred are (cyclo)aliphatic dicarboxylic acids, wherein $R_4$ has the meaning of a tetramethylene or cyclohexylene group. Other preferred units (IV) are those derived from a dimeric aliphatic fatty acid with at least 36 carbon atoms, such as with 44 carbon atoms.

If $R_4$ stands for a polyoxyalkylene group, it may be, e.g., built up wholly or in part of ethylene oxide groups, and it has generally a molecular weight of 600–6000 and an atomic ratio of carbon to oxygen of 2.0–4.3.

For the preparation of the copolyether amides according to the present invention reference may be made to EP 0761 715 A1. Generally, the following procedure is applied: first, the monomer to be polymerised, preferably a unit (I) monomer and most preferably epsilon-caprolactam, is added beforehand to a nitrogen atmosphere containing a small quantity of epsilon-aminocaproic acid or monomers such as adipic acid and hexamethylene diamine, after which the dicarboxylic acid and a preferably equimolar quantity of the polyoxyalkylene diamine are added. Following flushing with nitrogen, the reaction mixture is then heated to a temperature in the range of 190 to 270° C. over a period of 4 to 20 hours. Generally, the polymerisation reaction is carried out in the presence of a heat stabiliser such as 1,3,5-trimethyl-2,4,6-tris[3,5-di-tert.butyl4-hydroxybenzyl]-benzene and/or N,N'-hexamethylene-bis(3, 5-di-tert.butyl4-hydroxycinnamamide). In order to prevent the products being exposed to high temperatures for too long periods of time, which may result in potentially irreversible thermal decomposition, a catalyst may be employed if so desired. Frequently employed catalysts are sodium hypophosphite, phosphoric acid, and hypophosphorous acid. The polymerisation reaction usually is carried out until the resulting copolymer has a relative viscosity (measured on a solution of 1 g of polymer in 100 g of m-cresol of 25° C.) of at least 2.0, preferably 2.4–2.8, after which the molecular weight is increased further by post-condensation in the solid state until a viscosity value in the range of 3 to 4 is reached.

A preferred embodiment of the present invention consists in an irrigation mat. Such mats can be used, e.g., in countries with insufficient rainfall and ample sunlight and sea water or other salt water sources, as a means to obtain fresh water. Such a mat comprises at least an upper sheet which is capable of absorbing sunlight and a lower sheet which comprises a liquid-water-impermeable, water-vapour-permeable non-porous membrane and forms at least one channel or cavity with the upper sheet, wherein the membrane is made of the copolyether amide as described above.

When this mat is filled with water and exposed to sunlight, the water in the mat will be heated to about 60 to 80° C. and non-saline water vapour will emanate at the bottom. The water vapour is subsequently condensed into non-saline water. Thus, the mat will be able to desalinate and irrigate at the same time. At the end of the mat the remaining water, which has increased in salinity, will have to be drained.

The sole FIGURE represents the device of the invention.

In a preferred embodiment, the mat (sole FIGURE) consists of exactly two sheets (2,3), namely the said upper sheet and the said lower sheet. Surprisingly, it was found that in there will be no need for an additional cooling means or skirt to ensure condensation of pervaporated water. It was experimentally established that the cycle of day and night provides ample heat for pervaporation and sufficient cooling for condensation of substantial amounts of water in the soil (7) respectively. Mats of exactly two layers are reliable and simple to manufacture and hence have the added benefit of offering an affordable desalination device.

To further increase the life-span of the mat and improve its mechanical properties, such as strength, tear strength, abrasion resistance, and puncture resistance, it is preferred that the lower sheet comprises a nonwoven (5) for reinforcing the membrane (3).

Especially suitable and strong (spunbonded) nonwovens are those comprising thermally bonded filaments. The nonwoven preferably has a basic weight in the range from 20 to 150 g/m².

Needless to say, the degree of water vapour permeability of the membrane according to the invention is dependent not only on the composition of the polymer, but also on the thickness of the membrane. Generally speaking, water-vapour-permeable membranes used in desalination should meet the requirement of a water vapour-permeability of at least 500 g/m² as determined according to ASTM E96-66 (Method B modified: water temperature 30° C., ambient temperature 21° C. at 60% relative humidity (RH)). It was found that, in general, favourable results are attained when the film in hand has a thickness ranging from 5 to 200 µm. Optimum results are generally attained when the polymer film's thickness ranges from 10 to 100 µm.

Further, it is preferred that the polymers used in the present invention have a relative viscosity between 2.0 and 4.0, more preferably between 2.5 and 3.5, for such polymers combine good physical properties with ease of extrusion.

Within the framework of the present invention, the definition of sea water used is sea water taken from the North sea.

Determination of the relative viscosity:

The relative viscosity ($\eta_{rel}$) is measured in a solution of 1 g of polymer in 100 g of m-cresol of 25° C. in an Ubbelohde viscometer in accordance with ISO 1628/1 (1984). The solution must be prepared in such a way that degradation of the polymer during the dissolution is avoided. For copolyether amides, it is recommended that the solution be prepared by dissolving 1 g of the polymer in 100 g of m-cresol at 90° C. (which takes about 40 minutes). For copolyether esters (one of the comparative examples below), the solution is preferably prepared by dissolving 1 g of the polymer in 100 g of m-cresol at 135° C. (which takes about 15 minutes).

The invention will now be illustrated by way of the following unlimitative examples.

EXAMPLE I

Comparison Between a Copolyether Ester and the Copolyether Amide of the Present Invention The following samples were tested:
1. Polyetherester samples (PEE) consisting of 70% polybutylene terephtalate (PBT) and 30% polyethylene glycol (PEG) 4000. Furthermore they contained 0.5% of a phenolic stabilizer, viz. 1,3,5-trimethyl-2,4,6-tris[3,5-di-t-butyl-4-hydroxybenzyl]benzene. The samples had a thickness of 10 µm.
2. Copolyether amide (PEA) samples according to the present invention made from
   (i) 50 wt % of epsilon caprolactam,
   (ii) 25 wt % of poly(propylene oxide) containing 2-aminopropyl terminated groups and having a molecular weight of about 2000 (Jeffamine D2000 ex Huntsman),
   (iii) 25 wt % of poly(ethylene oxide) containing 2-aminopropyl terminated groups and having a molecular weight of about 2000 (Jeffamine ED2003 ex Huntsman), based on the total weight of epsilon caprolactam, PPO and PEO, and (iv) an equimolar amount of adipic acid, based on the total molar amount of PPO and PEO. Furthermore, they contained 0.5% non-blocking agent (micro talc) and 0.5% of the above-mentioned phenolic stabiliser. The samples had a thickness of 10 μm.

A vessel equipped with a water cooler was filled with sea water. The sea water was heated to 60° C. by means of a heating plate. The vessel was insulated with black insulation material. The sea water was magnetically stirred. In the vessel was placed a stainless steel rack which contained the polymer films to be tested with the dimensions 25 cm×5 cm×10 μm. After certain time intervals, a sample was taken out, rinsed with water, and dried under reduced pressure for 16 hours at 80° C., followed by measurement of the relative viscosity. The results of these measurements are indicated in Table 1.

TABLE 1

| | Relative viscosity | |
|---|---|---|
| Time in weeks | PEE | PEA according to the invention |
| 0 | 3.53 | 2.74 |
| 3 | 1.79 | — |
| 6 | 1.50 | — |
| 12 | — | 3.05 |
| 23 | — | 2.93 |
| 31 | — | 2.99 |

(— = not measured)

After six weeks, the polyether ester samples had disintegrated (visual inspection) and, therefore, measurements were discontinued. In contrast, the membrane according to the present invention showed a substantially constant relative viscosity throughout the experiment.

EXAMPLE II

Comparison Between a Copolyether Amide Wherein the Polyether and the (Poly)amide Segments are Linked via Ester Bridges (PEBAX) and a Copolyether Amide According to the Invention (Polyether and (Poly)amide Segments are Linked Via Amide Bridges The following samples were tested:
1. PEBAX®, which is a polyether block polyamide commercially available from Atochem. The sample was composed of 66 wt % of polyamide 11 or 12 and 34 wt % of polyethylene oxide, based on the total weight of the polyethylene oxide and the polyamide and further contained a diacid. Contrary to the copolyether amide of the present invention, the polyether and polyamide segments were linked via ester bridges (in the terminology of the present invention, in PEBAX, unit (III) is thus composed of —O—G—O— instead of —HN— NH—).
2. Copolyether amide (PEA) samples according to the present invention comprising
   (i) 60 wt % of epsilon caprolactam,
   (ii) 20 wt % of poly(propylene oxide) containing 2-aminopropyl terminated groups and having a molecular weight of about 2000 (Jeffamine D2000 ex Huntsman),
   (iii) 20 wt % of poly(ethylene oxide) containing 2-aminopropyl terminated groups and having a molecular weight of about 2000 (Jeffamine ED2003 ex Huntsman), based on the total weight of epsilon caprolactam, PPO and PEO, and
   (iv) an equimolar amount of adipic acid, based on the total molar amount of PPO and PEO, and (v) 0.5% non-blocking agent (micro talc) and 0.5% phenolic stabiliser as described in Example I.

The samples had a thickness of 15 μm.

The relative viscosities were determined as described in Example I. The results of these measurements are indicated in Table 2.

TABLE 2

| | Relative viscosity | |
|---|---|---|
| Time in weeks | PEBAX ® | PEA according to the invention |
| 0 | 3.10 | 3.29 |
| 4 | 2.80 | — |
| 11 | — | 3.17 |
| 23 | — | 2.95 |

(— = not measured)

Thus, the relative viscosity of PEBAX® decreases by about 10% within 4 weeks, whereas the copolyether amide of the present invention reaches the same order of viscosity decrease only after about 23 weeks.

Example III

Irrigation Mat According to the Present Invention

On a nonwoven of the Colback T100 type (100 g/m², supplied by Akzo Nobel Industrial Nonwovens) a film of the copolyether amide of Example I with an average thickness of 40 μm is provided by means of extrusion coating.

At its edges (and on the side of the polyether amide) the resulting composite film is glued together (Beiersdorf strip No. 8401) with a black PVC film of 300 μm in thickness and of equal length and width. In this way a mat composed of two sheets is created, the bottom sheets consisting of a water-vapour-permeable layer and the top sheet consisting of an impermeable layer. This mat is then provided with supply and discharge nipples.

Experiments in a sandbox of 1 m² in size with a simulated solar energy input of ~1000 kW/m² by a number of lamps, raising the temperature of the water to between 60 and 80° C., for 12 hours a day (with 12 hours of darkness) resulted in an estimated yield of fresh water of, on average, 3 l/m²/day. In dry regions with many sunny days (>300 a year) and little precipitation, this may produce approximately 1.0 to 1.3 m³ water per year per m². Effective irrigation is generally believed to require approximately 0.5 m³ water per year per m².

The mats can be laid, in the form of long strips, between rows of plants. Coverage of 50% of the soil by such mats provides an adequate method of irrigation.

What is claimed is:
1. Pervaporation device for the desalination of salt water comprising a channel or cavity for holding or transporting salt water comprising a water-impermeable layer and a liquid-water-impermeable, water-vapour-permeable non-porous membrane wherein the membrane is made of a copolyether amide which comprises

(a) units of the following structure (I)

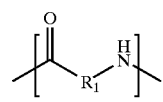

and/or (II)

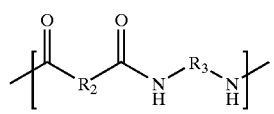

wherein $R_1$ has the meaning of an alkylene group with 3 to 11 carbon atoms which may be substituted or not, and $R_2$ and $R_3$ may be the same or different and represent a (cyclo)alkylene group with 4 to 11 carbon atoms which nay be substituted or not or a difunctional aromatic group, (b) polyoxyalkylene containing units of the following formula (III):

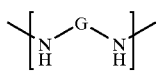

wherein G stands for a polyoxyalkylene group and (c) units of the following formula (IV)

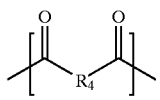

wherein $R_4$ has the meaning of a (cyclo)alkylene group which may be substituted or not, a polyoxyalkylene group or a difunctional aromatic group, and wherein units (III) are linked to units (I) and/or (II) and/or (IV) via amide bridges.

2. The pervaporation device of claim 1 wherein the copolyether amide comprises 40 to 70 wt % of units (I) and/or (II) and 30 to 60 wt % of units (III), based on the total weight of units (I), (II), and (III).

3. The pervaporation device of claim 1 wherein units (III) and (IV) are contained in the copolyether amide in a molar ratio of 0.9–1.1.

4. The pervaporation device of claim 1 wherein the copolyether amide comprises 10–30 wt % of ethylene oxide groups, based on total weight of units (I), (II), and (III) contained in the copolyether amide.

5. The pervaporation device of claim 1 wherein in unit (III), G has the meaning of a polyoxyalkylene group having a molecular weight of 600–6000.

6. The pervaporation device of claim 1 wherein the device comprises at least an upper sheet which is capable of absorbing sunlight and a lower sheet which comprises the liquid-water-impermeable, water-vapour-permeable membrane and which forms at least one channel or cavity with the upper sheet.

7. The pervaporation device of claim 6 wherein the device consists of exactly two sheets, namely the said upper sheet and the said lower sheet.

8. The pervaporation device of claim 6 or 7 wherein the lower sheet comprises a nonwoven for reinforcing the membrane and where the membrane has a water vapour-permeability of at least 500 g/m².

9. The pervaporation device of claim 6 wherein the lower sheet comprises a nonwoven for reinforcing the membrane.

10. The pervaporation device of claim 9 wherein the nonwoven has a basic weight in the range from 20 to 150 g/m².

11. The pervaporation device of any one of claim 6, 7, or 10 wherein the membrane has a water vapour-permeability of at least 500 g/m².

* * * * *

UNITED STATES PATENT AND TRADEMARK OFFICE
CERTIFICATE OF CORRECTION

PATENT NO. : 6,679,991 B1  
DATED : January 20, 2004  
INVENTOR(S) : Eleonoor Van Andel It is certified that error appears in the above-identified patent and that said Letters Patent is hereby corrected as shown below:

Column 9,  
Line 12, change "nay" to -- may --

Signed and Sealed this

Twentieth Day of April, 2004

JON W. DUDAS  
*Acting Director of the United States Patent and Trademark Office*